United States Patent [19]

Claesson

[11] Patent Number: 4,813,218
[45] Date of Patent: Mar. 21, 1989

[54] LAWN MOWER SUPPORT STRUCTURE

[75] Inventor: Tore V. Claesson, Kinna, Sweden

[73] Assignee: Husqvarna aktiebolag, Sweden

[21] Appl. No.: 122,171

[22] Filed: Nov. 18, 1987

[30] Foreign Application Priority Data

Nov. 20, 1986 [SE] Sweden ................. 8604961

[51] Int. Cl.[4] ..................... A01D 34/63; A01D 75/18
[52] U.S. Cl. .......................... 56/306; 56/12.6
[58] Field of Search ................. 56/12.6, 306; 248/603, 248/273

[56] References Cited

U.S. PATENT DOCUMENTS

| | | | |
|---|---|---|---|
| 1,832,368 | 11/1931 | Ell | 248/603 |
| 2,019,052 | 10/1935 | Lord | 56/306 |
| 2,076,699 | 4/1937 | Brown, Jr. | 248/603 |
| 2,144,170 | 1/1939 | Utz et al. | 56/306 |
| 2,838,262 | 6/1958 | Anderson | 248/603 |
| 3,056,249 | 10/1962 | Shaw | 56/12.6 |
| 3,430,901 | 3/1969 | Calvin | 248/573 |
| 3,773,285 | 11/1973 | Morrill | 248/603 |
| 3,901,003 | 8/1975 | Erdman | 56/12.6 |
| 4,008,556 | 2/1977 | Wegscherd | 56/12.6 |
| 4,584,928 | 4/1986 | Haynes | 248/603 |

FOREIGN PATENT DOCUMENTS 839311  6/1960  United Kingdom ................ 248/603

Primary Examiner—Paul J. Hirsch
Attorney, Agent, or Firm—Alfred E. Miller

[57] ABSTRACT

This invention relates to a lawn mower comprising a motor, preferably of the combustion engine type, rotating a knife about a vertical axis, a chassis surrounding said knife and a support structure between the motor and the chassis comprising vibration insulating means. The vibration insulating means comprise several elongated blocks (22) of elastic material the blocks being placed with their longitudinal axis in the radial direction so that they when being acted on by tangential forces (B) are deformed more than when they are acted on by radial forces (C) the support structure joining the chassis (16) and a motor support (10) to each other by separate means (28,29) allowing a limited tangetial movement between the motor support and the chassis and preventing separation of the motor support and the chassis.

6 Claims, 2 Drawing Sheets

LAWN MOWER SUPPORT STRUCTURE

This invention relates to a lawn mower comprising a motor, preferably of the combustion engine type, a rotating a blade about a vertical axis, and a chassis surrounding said blade, and a support structure between the motor and the chassis comprising vibration insulating means.

BACKGROUND OF THE INVENTION

In order to limit the transfer of vibrations from the cutting attachment to the operator it is previously known to fasten elastic details between the handle and the chassis and between the chassis and the motor.

The first mentioned type of system has certain drawbacks of which the following are important. The handle usually has a very small mass compared to the total mass in the swinging system which means that the major part of the vibrations after all are transferred to the operator. The handle feels flabby because of the soft fastening and the complete chassis vibrates together with the motor which means noise and strength problems with the chassis.

Also other systems have certain drawbacks. Thus, there is a risk that the blade touches the chassis when being overloaded i.e. when the elastic elements are stretched outside their ordinary working range or when the elements break. The radial distance between the ends of the blade and the chassis have to be made comparatively large in order to safeguard free movement which means difficulties for the operator to judge the cutting width and deteriorates the fan action of the blade which negatively effects the cutting result. Moreover, the elements are subject to an overload during the starting phase by the pull in the rope and by the strokes arising in the motor during the acceleration phase.

German OS No. 2,809,654 describes a lawn mower where the motor rests on rubber layers of different shapes which are placed on the top of the chassis. The motor is however fastened to the chassis by bolts and the purpose is to prevent structural swinging motions, or sound waves, to be transferred from one detail to the other. These layers do not work as insulating means for stiff body swinging motions, which is the purpose of our invention. Stiff body swinging motion, i.e. the swinging motion of the different parts (motor and chassis) with respect to each other has quite another amplitude and pre-supposes that the parts can move with respect to each other.

Swiss Pat. No. 229,959 shows a support structure for fastening an electric motor to a foundation. This structure does however not relate to a lawn mower and there are no measures taken for safeguarding that the parts are not separated if the elastic elements should break during operation. Moreover the elastic elements are rather complicated and hence expensive compared to the elements suggested in the present application.

By means of a device according to the present invention all the above described problems have been solved and the arrangements also means reduced need for service and reduced costs for such service and at the same time the production costs are decreased.

BRIEF DESCRIPTION OF THE DRAWINGS

An embodiment of the invention will now be described with reference to the accompanying drawings.

DESCRIPTION OF THE PREFERRED EMBODIMENT

Figure 1:
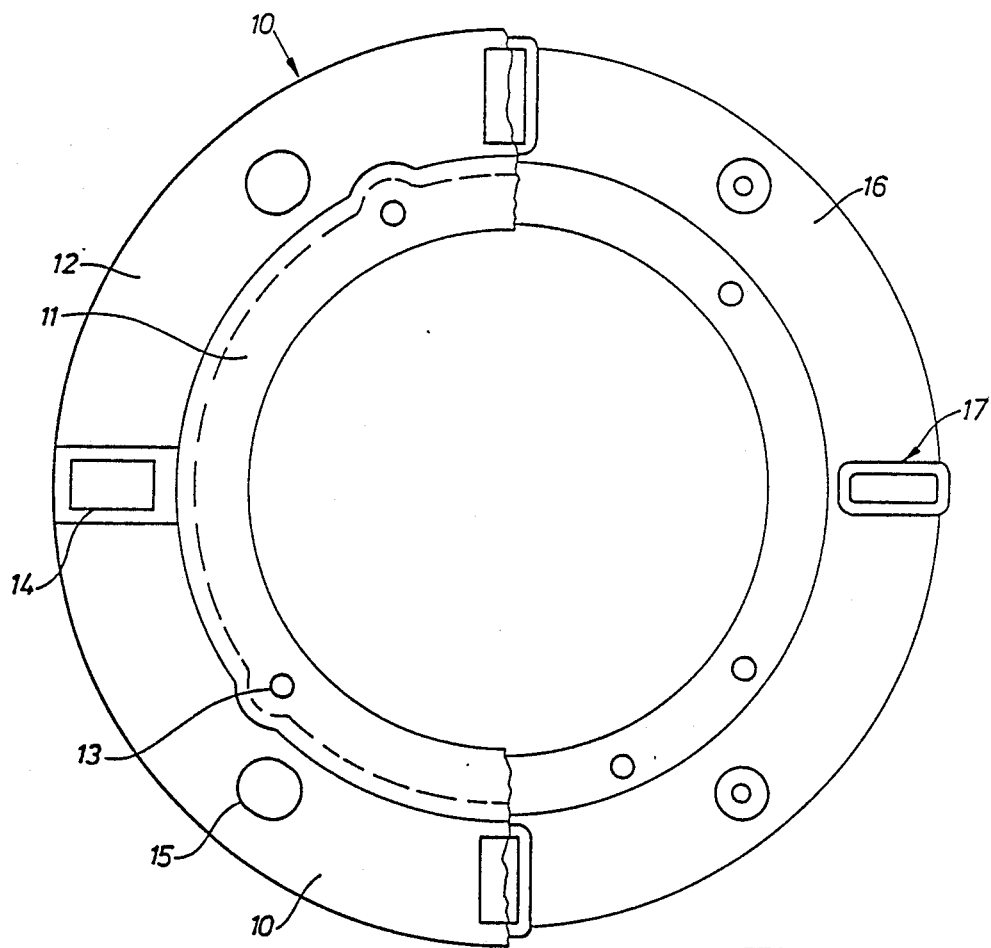
FIG. 1 is a partly broken top view of a motor support and the deck below without the vibration insulating means.

In the left hand half of FIG. 1 a motor support 10 comprising mainly of an annular metal plate is shown. The inner part 11 of the motor support 10 is somewhat higher compared to its outermost part 12. The inner part 11 has several holes 13 by means of which a motor, not shown, can be fastened on the support by screw joints. The outer part 12 has several rectangular holes 14 in order to take up the insulating elements in a way which will be described below. The same part also has several oval-shaped holes 15 which are designed to take up a fastening means for the motor support 10.

Figure 3:
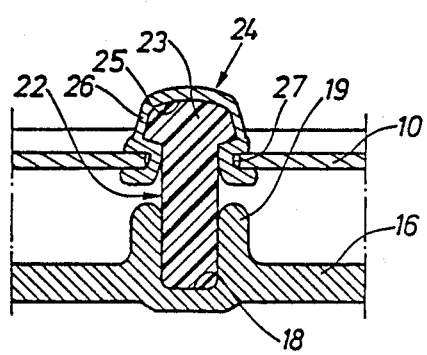
FIG. 3 is a vertical section through one of the insulating elements.

The right hand side of FIG. 1 shows an annular deck 16 situated below the motor support. The deck can be a part of the casing forming the chassis or, in a suitable way, be fastened to it. The deck 16 has several pockets 17 having a rectangular bottom 18, as seen in FIG. 3 which is limited and surrounded by a upwards extending bead 19. Furthermore, the deck 16 on its top surface has several cylindrical dowels 20 having a central threaded hole 21.

Figure 2:
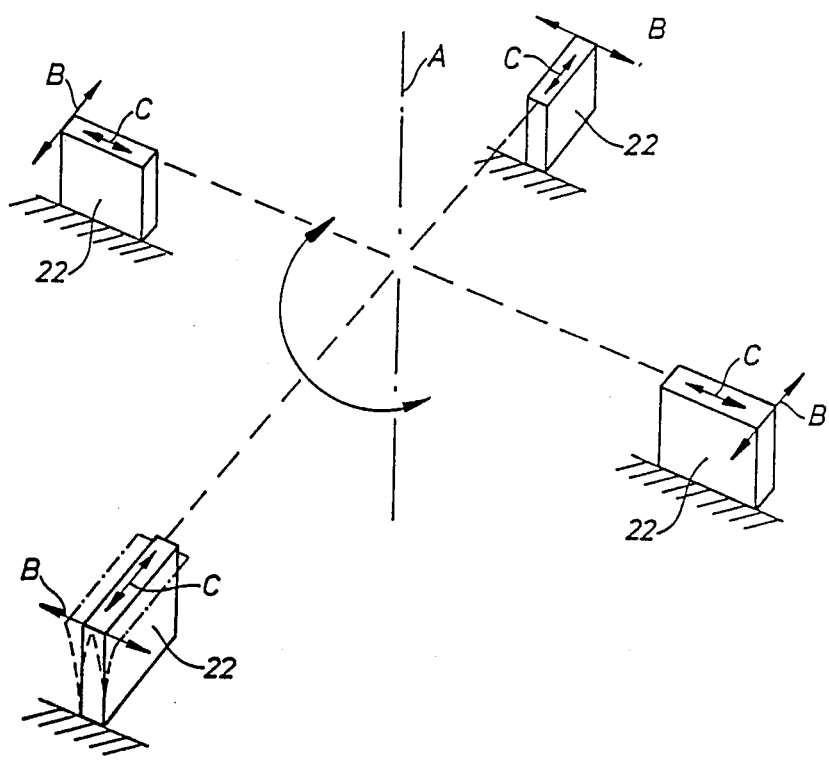
FIG. 2 is a perspective view showing the basic structure of the insulating means.

Between the motor support 10 and the deck 16 several insulating elements are attached. These elements comprise elongated rubber blocks 22 which are placed so that their longitudinal axis is directed radially with respect to the rotation shaft A of the motor. This is clearly seen in FIG. 2. By the positioning and shape of the blocks a low spring constant is achieved in the rotation direction, i.e. in the direction indicated by the arrows B whereas the spring constant in radial direction, i.e. in the direction of C, is considerably greater. This means a better vibration insulation than if the elements would have the same spring constant in all directions which, in turn, means that the distance between the ends of the blade and casing can be minimized.

The blocks 22 can, for instance, be provided with a head 23 as shown in FIG. 3 whereby each block by means of a bracket 24 is fastened to the motor support 10. The bracket which preferably is constituted of plastic or metal forms a U-shaped clamp with an expanding bottom part 25 in which the head 23 of the block can be inserted and maintained. On the outside of the two legs 26 of the clamp 24 there is a longitudinal groove 27. By putting the clamp 24 with the block 22 in the hole 14 of the motor support 10 whereby the grooves 27 by compression of the block can be forced to engage the edges of the hole the block 22 is secured to the motor support 10. Thus, the motor support is placed on the deck 16 and the rubber blocks 22 are allowed to fall into the pockets 17.

Figure 4:
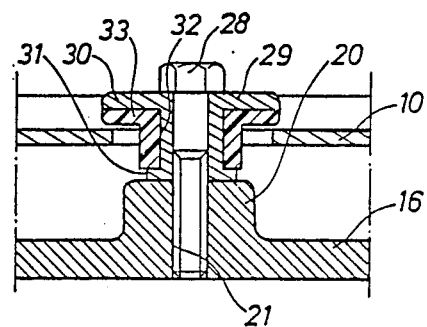
FIG. 4 is a vertical section through a joint between the deck and the motor support.

In order to join the motor support and the deck to each other a fastening device illustrated in FIG. 4 is used. The fastening device comprises a screw 28 taking up a sleeve 29 with an upper and a lower flange 30 and 31 respectively. The sleeve 29 is in turn surrounded by a rubber sleeve 32 which is also provided with an upper flange 33. By inserting the screw 28 with the attached sleeves 29 and 32, respectively, through the hole 15 of the motor support 10 and fastening the screw to the threaded hole 21 on the deck 16, the motor support is locked to the deck with minor axial play. It should be observed that the size of the hole 15 compared to the outer diameter of the sleeve 32 is such that a certain tangential movement of the motor support is allowed. It is, of course, possible within the framework of the invention to invert the fastening arrangement i.e. to place the holes in the deck and the screw with the sleeves on the motor support.

Figures 5, 6:
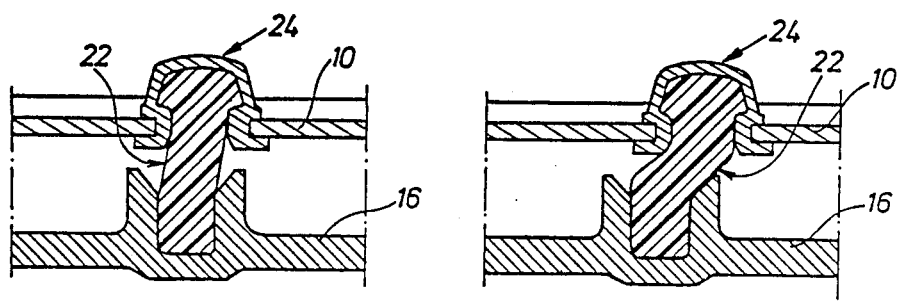
FIG. 5 shows in vertical section the insulating element during normal operation and FIG. 6 is the same section shows the insulating element when being overloaded.

In FIGS. 5 and 6 the deformation of the rubber blocks during normal load and overload is shown. From the figures the blocks 22 are shown by means of their clamps 24 to be guided to work with a shorter lever when being overloaded. This means that the blocks can be made very soft without the movement when overloaded being unacceptably great. Since the blocks are not vulcanized to the clamps, which is common in similar arrangements, a far cheaper system is achieved which at the same time is more reliable. The fastening arrangement shown in the figure means that the axial forces, i.e. vertical forces, are completely taken up by the screws 28 at the same time as a certain movement is allowed in the tangential direction.

By this arrangement the blade never can reach the chassis even if all the blocks should be destroyed.

I claim:

1. In a lawn mower having a motor, a cutting blade rotated by said motor about a substantially vertical axis, a chassis surrounding said blade, a motor support, and a support structure mounted between said motor and the chassis and including vibration insulation means, the improvement comprising; said vibration insulating means including a plurality of elongated blocks of resilient material, the blocks being placed with their longitudinal axis in the radial direction so that when they are acted upon by a tangential force are deformed more than when they are acted upon by a radial force, and separate means for joining the chassis and motor support whereby a limited tangential movement is permitted between said motor support and chassis while preventing the separation of said chassis and motor support, said separate means comprising sleeves having flanges that are fixed to said chassis.

2. A lawn mower as claimed in claim 1 wherein said motor support is provided with spaced holes, and said sleeves are freely extending through said holes whereby said flanges of the sleeves lock said motor support to said chassis.

3. A lawn mower as claimed in claim 2 further comprising a rubber cover on said sleeve, and facing said motor support.

4. A lawn mower as claimed in claim 1 further comprising releasable clamps, and said elongated resilient blocks being secured to said motor support or chassis by said releasable clamps.

5. A lawn mower as claimed in claim 4 wherein said clamps are U-shaped, and the outer part of the legs are provided with grooves to engage the edges of holes in said chassis or motor support.

6. A lawn mower as claimed in claim 1 further comprising pockets wherein the elongated resilient bodies rest in said pockets on said chassis or on the motor support.

* * * * *